United States Patent [19]
Suzuki et al.

[11] Patent Number: 5,219,942
[45] Date of Patent: Jun. 15, 1993

[54] RUBBER COMPOSITIONS

[75] Inventors: Fumitoshi Suzuki, Yokohama; Yoshihiro Chino, Koshigaya; Shuichi Akita, Yokohama, all of Japan

[73] Assignees: Nippon Zeon Co., Ltd.; The Yokohama Rubber Co., Ltd., both of Tokyo, Japan

[21] Appl. No.: 627,133

[22] Filed: Dec. 13, 1990

[30] Foreign Application Priority Data

Dec. 20, 1989 [JP] Japan ................. 1-330663

[51] Int. Cl.$^5$ .............................................. C08L 7/00
[52] U.S. Cl. .................................. 525/212; 525/217; 525/236; 525/237
[58] Field of Search .......... 525/217, 212, 236, 237, 525/420, 432, 436, 215

[56] References Cited

U.S. PATENT DOCUMENTS

| | | | |
|---|---|---|---|
| 3,946,385 | 3/1976 | Ewen ................... | 342/386 |
| 3,992,561 | 11/1976 | Hargis et al. ............. | 526/181 |
| 4,079,176 | 3/1978 | de Zarauz ............... | 526/177 |
| 4,092,268 | 5/1978 | de Zarauz ............... | 502/153 |
| 4,112,210 | 9/1978 | de Zarauz ............... | 526/187 |
| 4,129,705 | 12/1978 | de Zarauz ............... | 526/181 |
| 4,260,519 | 4/1981 | Aggarwal et al. ......... | 526/181 |
| 4,297,240 | 10/1981 | Bingham et al. .......... | 526/124 |
| 4,555,548 | 11/1985 | Ueda et al. .............. | 525/237 |
| 4,950,719 | 8/1990 | Oyama et al. ............ | 525/217 |
| 5,017,636 | 5/1991 | Hattori et al. ............ | 524/300 |

FOREIGN PATENT DOCUMENTS

4015612 11/1990 Fed. Rep. of Germany .
57-100146 6/1982 Japan .

OTHER PUBLICATIONS

Abstract for Japanese Patent Application 1,096,233, Derwent Publications (AN 89-155112) Apr. 14, 1988.
I. M. Kolthoff et al, "Determination of Polystyrene in GR–S Rubber" J. Polym. Sci., 1, 429 (1946).

*Primary Examiner*—Paul R. Michl
*Assistant Examiner*—Olga Asinovsky
*Attorney, Agent, or Firm*—Lowe, Price, LeBlanc & Becker

[57] ABSTRACT

A rubber composition comprises as rubber components (A) 30–95 wt. % of an end-modified styrene-butadiene copolymer and (B) 70–5 wt. % of a diene rubber other than the end-modified styrene-butadiene copolymer (A). The end-modified styrene-butadiene copolymer (A) is obtained by reacting at least one compound to active terminals of a starting styrene-butadiene copolymer containing butadiene moieties, the trans-1,4 bond content of which is 70–95 wt. %, and having a styrene content of 5–60 wt. %. The at least one compound is selected from N-substituted aminoketones, N-substituted thioaminoketones, N-substituted aminoaldehydes, N-substituted thioaminoaldehydes and compounds containing in the molecules thereof an atomic group represented by the following formula:

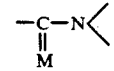

in which M stands for an oxygen or sulfur atom. The diene rubber (B) has a glass transition temperature higher than −60° C.

7 Claims, No Drawings

RUBBER COMPOSITIONS

FIELD OF THE INVENTION

The present invention relates to rubber compositions significantly improved in abrasion resistance, and more specifically to rubber compositions comprising an end-modified styrene-butadiene copolymer, which contains trans-1,4 bonds at a high ratio and has specific atomic groups at active terminals, and a diene rubber other than the end-modified styrene-butadiene copolymer, said diene rubber having a particular glass transition temperature.

BACKGROUND OF THE INVENTION

In rubbers for tire treads and the like, low-vinyl polybutadiene rubbers, low-styrene or low-vinyl styrene-butadiene copolymer rubbers have conventionally been used by way of example to improve abrasion resistance.

Rubber compositions containing such a low-vinyl or low-styrene rubber as a principal component are however accompanied by the drawback that they are lowered in wet skid resistance, an important characteristic required for tire treads.

Use of a rubber composition containing a high-vinyl polybutadiene or a high-styrene styrene-butadiene copolymer rubber for improved wet skid resistance however results in a reduction in abrasion resistance. Especially, high-styrene styrene-butadiene copolymer rubbers are accompanied by the drawback that rebound is reduced to lead to increased tire rolling resistance.

In the meantime, the present inventors have already found that the rebound of a diene polymer can be significantly improved by the introduction of specific atomic groups in the polymer through a reaction of the diene polymer having active alkali metal and/or alkaline earth metal terminals, with a compound containing in the molecule thereof a

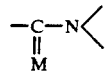

bond in which M stands for an oxygen or sulfur atom (U.S. Pat. No. 4,647,625). In addition, it has already been found that the diene rubber polymer with the atomic groups introduced therein has been improved not only in rebound but also in abrasion resistance and wet skid resistance. However, the abrasion resistance so improved cannot be considered high enough to sufficiently meet the level required in recent years, resulting in a demand for a still greater improvement.

On the other hand, rubber compositions blended with a styrene-butadiene copolymer rubber containing butadiene units of a high trans content are dealt with, for example, in Japanese Patent Application Laid-Open No. 100146/1982. Primary objects however reside in improvements in processing characteristics and cold flow characteristics and also in improvements in the wet skid resistance reduced due to the use of the copolymer rubber. As a matter of fact, abrasion resistance is improved very little.

OBJECTS AND SUMMARY OF THE INVENTION

An object of the present invention is to provide a rubber composition not only excellent in breaking strength and abrasion resistance but also improved in the balancing between rolling resistance and wet skid resistance.

The present inventors have proceeded with a further extensive investigation with a view toward overcoming the above-described problems of the conventional art. As a result, it has been found that blending of a styrene-butadiene copolymer, which contains trans-1,4 bonds at a high ratio in butadiene units thereof and has been modified by a reaction of its active terminals with a compound containing a specific atomic group therein, with a suitable amount of a diene rubber other than the copolymer, said diene rubber having a glass transition temperature (Tg) higher than −60° C., can provide excellent breaking strength, significantly improved abrasion resistance and, further improved rolling resistance and wet skid resistance without reduction to the balancing therebetween, leading to the completion of the present invention.

In one aspect of the present invention, there is thus provided a rubber composition comprising as rubber components:

(A) 30-95 wt. % of an end-modified styrene-butadiene copolymer obtained by reacting at least one compound to active terminals of a starting styrene-butadiene copolymer containing butadiene units, the trans-1,4 bond content of which is 70-95 wt. %, and having a styrene content of 5-60 wt. %, said at least one compound being selected from N-substituted aminoketones, N-substituted thioaminoketones, N-substituted aminoaldehydes, N-substituted thioaminoaldehydes and compounds containing in the molecules thereof an atomic group represented by the following formula:

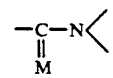

in which M stands for an oxygen or sulfur atom; and (B) 70-5 wt. % of a diene rubber other than the end-modified styrene-butadiene copolymer (A), said diene rubber having a glass transition temperature higher than −60° C.

DETAILED DESCRIPTION OF THE INVENTION

Features of the present invention will hereinafter be described in detail.

Styrene-butadiene copolymer

The styrene-butadiene copolymer employed in the present invention contains butadiene units whose trans-1,4 bond content is 70-95 wt. %, and therefore has a high trans bond content.

Trans-1,4 bond contents lower than 70 wt. % lead to a reduction in both breaking strength and abrasion resistance.

A styrene-butadiene copolymer having such a high trans-1,4 bond content can be obtained by copolymerizing styrene and butadiene, usually, in the presence of a composite catalyst containing alkaline earth metals. It is however difficult to obtain those having a trans-1,4 bond content higher than 95 wt. %.

The preferred trans-1,4 bond content is 75-95wt. %.

On the other hand, the styrene content of the styrene-butadiene copolymer is 5-60 wt. %.

Styrene contents lower than 5 wt. % cannot improve the balancing between abrasion resistance and wet skid resistance, while styrene contents higher than 60 wt. % cannot bring about improvements in abrasion resistance but rather lead to a substantial reduction in abrasion resistance.

The preferred styrene content is 5–45 wt. %.

Preferably, the styrene-butadiene copolymer has a weight average molecular weight (measured by GPC) of about 150,000–500,000 as calibrated based on standard polystyrene. Further, the Mooney viscosity ($ML_{1+4}$, 100° C.; measured under JIS K-6301) may be at least 10, with 30 or higher being preferred. The upper limit may be about 150 or so when oil extension is taken into consideration. An unduly low weight average molecular weight or Mooney viscosity results in inferior strength characteristics.

In addition, it is preferable that styrene units are distributed at random along the molecular chain of the styrene-butadiene copolymer. Preferred is, for example, a random styrene-butadiene copolymer whose block polystyrene content as measured in accordance with the oxidative decomposition method proposed by I. M. Kolthoff et al. [J. Polym. Sci., 1, 429(1946)] is 10 wt. % or lower, preferably 5 wt. % or lower, more preferably 1 wt. % or lower of the copolymer.

Especially, the inclusion of styrene blocks near the terminals of the molecular chain of a styrene-butadiene copolymer leads to inconvenient properties such that the copolymer becomes harder at low temperatures. No particular limitation is however imposed on the distribution of styrene units along the molecular chain unless styrene blocks are contained.

The styrene-butadiene copolymer useful in the practice of the present invention, butadiene units of which contain trans-1,4 bonds at a high ratio, can be obtained by solution-polymerizing styrene and butadiene, generally, using a composite catalyst containing alkaline earth metals.

Exemplary composite catalysts containing alkaline earth metals include catalyst systems composed principally of barium compound, strontium compound, calcium compound and/or the like, as disclosed in patent publications such as U.S. Pat. Nos. 3946385, 3992561, 4079176, 4092268, 4112210, 4129705, 4260519 and 4297240, although not necessarily limited thereto.

The catalyst can be used generally in an amount of 0.05–20 mmol, preferably 0.5–10 mmol, more preferably 1–7 mmol in terms of alkaline earth metal atoms per 100 g of the monomer mixture.

Modification of active terminals

The present invention makes use of an end-modified styrene-butadiene copolymer which is obtained by reacting a styrene-butadiene copolymer, said copolymer having active terminals after completion of its polymerization, with at least one compound selected from N-substituted aminoketones, N-substituted thioaminoketones, N-substituted aminoaldehydes, N-substituted thioaminoaldehydes and compounds containing in the molecules thereof an atomic group represented by the following formula:

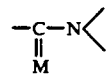

in which M stands for an oxygen or sulfur atom.

The use of the styrene-butadiene copolymer having the high trans-1,4 bond content and subjected to the end modifications has made it possible for the first time to achieve excellent improvements in breaking strength and abrasion resistance and also improvements in the balancing between rolling resistance and wet skid resistance.

Exemplary organic compounds usable in this end-modifying reaction include N-substituted aminoketones such as 4-dimethylaminobenzophenone, 4-diethylaminobenzophenone, 4-di-t-butylaminobenzophenone, 4-diphenylbenzophenone, 4,4'-bis(dimethylamino)benzophenone, 4,4'-bis(diethylamino)benzophenone, 4,4'-bis(di-t-butylamino)benzophenone, 4,4'-bis(diphenylamino)benzophenone, 4,4'-bis(divinylamino)benzophenone, 4-dimethylaminoacetophenone, 4-diethylaminoacetophenone, 1,3-bis(diphenylamino)-2-propanone and 1,7-bis(methylethylamino)-4-heptanone, and their corresponding N-substituted aminothioketones; N-substituted aminoaldehydes such as 4-dimethylaminobenzaldehyde, 4-diphenylaminobenzaldehyde and 4-divinylaminobenzaldehyde, and their corresponding N-substituted aminothioaldehydes; N-substituted lactams such as N-methyl-$\beta$-propiolactam, N-t-butyl-$\beta$-propiolactam, N-methoxyphenyl-$\beta$-propiolactam, N-naphthyl-$\beta$-propiolactam, N-methyl-2-pyrrolidone, N-t-butyl-2-pyrrolidone, N-phenylpyrrolidone, N-methoxyphenyl-2-pyrrolidone, N-vinyl-2-pyrrolidone, N-benzyl-2-pyrrolidone, N-naphthyl-2-pyrrolidone, N-methyl-5-methyl-2-pyrrolidone, N-t-butyl-5-methyl-2-pyrrolidone, N-phenyl-5-methyl-2-pyrrolidone, N-methyl-3,3'-dimethyl-2-pyrrolidone, N-t-butyl-3,3'-dimethyl-2-pyrrolidone, N-phenyl-3,3'-dimethyl-2-pyrrolidone, N-methyl-2-piperidone, N-t-butyl-2-pyrrolidone, N-phenyl-2-piperidone, N-methoxyphenyl-2-piperidone, N-vinyl-2-piperidone, N-benzyl-2-piperidone, N-naphthyl-2-piperidone, N-methyl-3,3'-dimethyl-2-piperidone, N-hexyl-3,3'-dimethyl-2piperidone, N-methyl-$\epsilon$-caprolactam, N-phenyl-$\epsilon$-caprolactam, N-methoxyphenyl-$\epsilon$-caprolactam, N-vinyl-$\epsilon$-caprolactam, N-benzyl-$\epsilon$-caprolactam, N-naphthyl-$\epsilon$-caprolactam, N-methyl-$\omega$-laurylolactam, N-phenyl-$\omega$-laurylolactam, N-t-butyl-$\omega$-laurylolactam, N-vinyl-$\omega$-laurylolactam and N-benzyl-$\omega$-laurylolactam, and their corresponding thiolactams; as well as N-substituted ethyleneureas such as 1,3-dimethylethyleneurea, 1,3-diphenylethyleneurea, 1,3-di-t-butylethyleneurea and 1,3-divinylethyleneurea, and their corresponding N-substituted thioethyleneureas.

These compounds can be used generally in an amount of 0.05–10 moles, preferably 0.2–2 moles per mole of the polymerization catalyst to be employed.

After completion of the polymerization reaction, the polymerization mixture is added with one of these compounds, followed by an end-modifying reaction which generally proceeds for several seconds to several minutes at room temperature to 100° C. After completion of the reaction the end-modified styrene-butadiene copolymer is recovered from the reaction mixture by steam stripping or the like.

In the present invention, it is also possible to replace up to 30 wt. % of the copolymer with another end-modified styrene-butadiene copolymer which has been subjected to coupling with a coupling agent such as $SnCl_4$ or $SiCl_4$.

Rubber composition

The rubber composition according to the present invention contains, as a rubber component, a mixture of (A) the above end-modified styrene-butadiene copolymer and (B) a diene rubber other than the copolymer, said diene rubber having a glass transition temperature (Tg) higher than −60° C.

The proportion of the end-modified styrene-butadiene copolymer (A) in the rubber component is 30–95 wt. %. Proportions smaller than 30 wt. % cannot improve abrasion resistance, whereas proportions greater than 95 wt. % lead to a substantial reduction in wet skid resistance although abrasion resistance can be improved. The preferred proportion is 30–90 wt. %, with 40–80 wt. % being more preferred.

The diene rubber (B) must have a glass transition temperature (Tg) higher than =60° C. Glass transition temperatures not higher than −60° C. lead to a deterioration in the balancing between rolling resistance and wet skid resistance. The preferred Tg of the diene rubber is in the range of from −50° C. to 0° C.

No particular limitation is imposed on the diene rubber (B) as long as its Tg is higher than −60° C. Specific examples include styrene-butadiene copolymers, butadiene polymers, isoprene polymers, halogenated butyl rubbers and the like, which have been produced by emulsion polymerization or solution polymerization.

The proportion of the diene rubber (B) in the rubber component is 70–5 wt. %. Proportions higher than 70 wt. % cannot improve abrasion resistance, whereas proportions smaller than 5 wt. % lead to a deterioration in wet skid resistance. The preferred proportion is 70–10 wt. %, with 60–20 wt. % being more preferred.

The rubber composition according to the present invention is prepared by incorporating various additives in the rubber component which is the mixture of
(A) the end-modified styrene-butadiene copolymer and
(B) the diene rubber.

These various additives are mixed in the rubber component by using a mixing means such as a roll mill or Banbury mixer.

Such various additives can be chosen from those commonly employed in the rubber industry, in the light of the application purpose of the rubber composition of the present invention, and no particular limitation is imposed on the additives. Described specifically, there are vulcanizing agents such as sulfur, stearic acid, zinc oxide, various vulcanization accelerators (thiazoles, thiurams, sulfenamides, etc.), and organic peroxides; reinforcing agents such as carbon blacks of various grades, e.g., HAF and ISAF, and silica; fillers such as calcium carbonate and talc; and other additives such as processing oils, processing aids, vulcanization retarders, and antioxidants. In general, the kinds, combination and amounts of these additives can be suitably chosen depending on the application purpose of the rubber composition, and no particular limitation is imposed thereon.

ADVANTAGES OF THE INVENTION

The present invention can provide improved rubber compositions excellent in breaking strength and abrasion resistance and also enhanced in the balancing between rolling resistance and wet skid resistance.

The rubber compositions according to the present invention are suitable especially for tire treads.

EMBODIMENTS OF THE INVENTION

The present invention will hereinafter be described specifically by the following examples and comparative examples, in which all designations of "part" or "parts" and "%" are on a weight basis unless otherwise specifically indicated.

Examples 1–31 & Comparative Examples 1–30

Styrene.-butadiene copolymers

In each of the examples and comparative examples, a polymerization reactor constructed of a stainless steel autoclave having an internal capacity of 15 l was washed, dried and then purged with dry nitrogen. The reactor was charged with 1,3-butadiene and styrene in the corresponding amounts shown in Table 1, and then with 7,000 g of cyclohexane.

A dibutyl magnesium/triethyl aluminum complex (Mg/Al molar ratio: 5.0) and t-butoxy barium were then added in the corresponding amounts given in Table 1. It is however to be noted that the amount of the dibutyl magnesium/triethyl aluminum complex is indicated in terms of magnesium.

The contents of the polymerization reactor were subjected to polymerization under stirring at 80° C. for 5 hours. After completion of the polymerization reaction, the corresponding reactant specified in Table 1 was added in an amount of 0.05 mole, followed by an addition reaction (end-modifying reaction) for 30 minutes.

Thereafter, methanol was added to the polymerization reactor so that the reaction was terminated. After 8 g of 2,6-di-t-butyl-p-cresol (BHT) were added, the solvent was removed by steam stripping. Drying of the resultant end-modified polymer was carried out at 60° C. for 24 hours.

In each of the examples in which no end modification was conducted, the corresponding dry polymer was obtained in a similar manner except that, after completion of the polymerization reaction, no reactant was added and no addition reaction was conducted.

Measurement results of the styrene content of the styrene-butadiene copolymer obtained in the above-described manner and of the trans-1,4 bond content of its butadiene moieties are shown together with its Mooney viscosity ($ML_{1+4}$, 100° C.) in Table 1.

The styrene content was determined by converting a value—which had been measured by the Hampton method using an infrared spectrometer—into an NMR value in accordance with a calibration curve. On the other hand, the trans-1,4 bond content of the butadiene units was determined by the Molero method, using an infrared spectrometer.

Diene rubbers

In each of the examples and comparative examples, a polymerization reactor constructed of a stainless steel autoclave having an internal capacity of 15 l was washed, dried and then purged with dry nitrogen. The reactor was charged with 1,3-butadiene and styrene in the corresponding amounts specified in Table 2, and then with 7,000 g of cyclohexane.

N,N,N',N'-tetramethylethylenediamine was next charged in the corresponding amount shown in Table 2, and n-butyl lithium was finally added in the corresponding amount given in Table 2. The contents of the polymerization reactor were subjected under stirring to polymerization at 50° C. for 2 hours.

After completion of the polymerization reaction, methanol was added to the polymerization reactor to terminate the reaction. Subsequent to addition of 8 g of BHT, the solvent was removed by steam stripping.

Drying of the resultant polymer was conducted at 60° C. for 24 hours.

Measurement results of the styrene content of the diene rubber obtained in the above-described manner, of the 1,2-vinyl bond content in its butadiene units and of its Tg are shown together with its Mooney viscosity ($ML_{1+4}$, 100° C.) in Table 2.

The styrene content and the 1,2-vinyl bond content of the butadiene units were each obtained by converting a value—which had been measured by the Hampton method, using an infrared spectrometer—into an NMR value in accordance with a calibration curve. On the other hand, Tg was determined by measuring the onset value of a DSC curve of the polymer.

Rubber compositions

In each of the examples and comparative examples, the rubber composition was obtained by using the corresponding polymers in Tables 1 and 2 and mixing the corresponding mixed rubber, which is given in the corresponding table of Tables 4-12, as a rubber component with the various additives in the respective proportions specified in Table 3 in a 250-ml mixer of the Brabender type. The rubber composition was vulcanized under pressure at 160° C. for 20 minutes, whereby its test pieces were formed. Physical properties of the thus-vulcanized material were measured.

TABLE 3

(Formulation)

| | |
|---|---|
| Rubber component | 100 parts |
| Zinc oxide | 3 parts |
| Stearic acid | 2 parts |
| HAF carbon black | 50 parts |
| Aromatic oil | 5 parts |
| Accelerator, MSA* | 1.1 parts |
| Sulfur | 1.5 parts |

*N-Oxydiethylene-2-benzothiazylsulfenamide

The results of the examples and comparative examples are summarized in Table 4 through Table 12.

Incidentally, the following evaluation methods were employed.

Breaking strength (tensile strength)
Measured under JIS K-6301.
Rebound:
Measured at 60° C. using a Dunlop tripsometer. The value of the measurement was then converted to an index of rolling resistance.
Abrasion resistance:
Measured by Pico Abrader under ASTM-D-2228. The value of the measurement was then converted to an index.
Wet skid resistance:
Measured at 23° C. on a road surface specified in ASTM-E-303-74, using a portable skid tester. The value of the measurement was then converted to an index.

As is shown in Table 4 through Table 12, the rubber compositions of the present invention are improved in breaking strength (tensile strength) and abrasion resistance and also in the balancing between wet skid resistance and rolling resistance over the rubber compositions of the comparative examples. In particular, the improvements in abrasion resistance are substantial.

Incidentally, the glass transition temperatures (Tg) of the polybutadiene ("Nipol BR-1220", trade name) and natural rubber (NR RSS#3) in Tables 7-10 are as follows:

| | Tg |
|---|---|
| Nipon1 BR-1220 | −115° C. |
| NR RSS#3 | −67° C. |

TABLE 1

| | Amount charged upon polymerization | | | | | Characteristics of produced polymer | | |
|---|---|---|---|---|---|---|---|---|
| Polymer | Styrene (g) | Butadiene (g) | Mg/Al (mol) | Ba (mmol) | Reactant | Styrene (%) | Trans (%) | $ML_{1+4}$ |
| A | 0 | 1000 | 0.023 | 5.6 | N-Methyl-2-pyrrolidone | 0 | 73.7 | 37.1 |
| B | 70 | 930 | 0.036 | 5.4 | N-Methyl-2-pyrrolidone | 7.2 | 89.5 | 33.6 |
| C | 70 | 930 | 0.036 | 5.4 | None | 7.2 | 89.5 | 32.3 |
| D | 70 | 930 | 0.027 | 5.4 | N-Vinyl-2-pyrrolidone | 7.5 | 80.2 | 35.1 |
| E | 140 | 860 | 0.027 | 4.6 | N-Vinyl-2-pyrrolidone | 13.7 | 86.2 | 31.2 |
| F | 140 | 860 | 0.021 | 4.2 | N-Vinyl-2-pyrrolidone | 13.1 | 79.9 | 44.5 |
| G | 140 | 860 | 0.011 | 4.0 | Diethylaminobenzophenone | 14.1 | 68.9 | 56.2 |
| H | 200 | 800 | 0.032 | 4.8 | N-Methyl-ε-caprolactam | 19.9 | 87.8 | 36.3 |
| I | 200 | 800 | 0.018 | 4.0 | N-Methyl-ε-caprolactam | 20.1 | 77.8 | 38.7 |
| J | 200 | 800 | 0.013 | 4.0 | N-Phenyl-2-pyrrolidone | 20.8 | 66.0 | 64.1 |
| K | 280 | 720 | 0.036 | 5.4 | Dimethyl-imidazolidinone | 28.1 | 84.3 | 40.4 |
| L | 280 | 720 | 0.036 | 5.4 | None | 28.1 | 84.3 | 42.8 |
| M | 410 | 590 | 0.035 | 5.2 | N-Methyl-ε-caprolactam | 41.5 | 83.7 | 41.1 |
| N | 410 | 590 | 0.023 | 5.2 | N-Methyl-ε-caprolactam | 40.4 | 77.5 | 52.1 |
| O | 410 | 590 | 0.020 | 5.0 | N-Methyl-ε-caprolactam | 40.9 | 63.5 | 58.1 |
| P | 630 | 370 | 0.023 | 5.0 | Diethylaminobenzophenone | 62.7 | 72.1 | 61.1 |

TABLE 2

| | Amount charged upon polymerization | | | | Characteristics of produced polymer | | | |
|---|---|---|---|---|---|---|---|---|
| Polymer | Styrene (g) | Butadiene (g) | TEMDA (ml) | BuLi (mol) | Styrene (%) | Vinyl (%) | Tg (°C.) | $ML_{1+4}$ |
| a | 135 | 865 | 2.2 | 0.0056 | 13.8 | 71.7 | −23 | 32.1 |
| b | 150 | 850 | 0.3 | 0.0055 | 14.6 | 35.6 | −61 | 38.6 |
| c | 240 | 760 | 0.5 | 0.0054 | 23.7 | 37.1 | −49 | 35.3 |
| d | 170 | 830 | 0 | 0.0056 | 17.2 | 11.3 | −76 | 33.1 |
| e | 0 | 1000 | 2.5 | 0.0052 | — | 76.2 | −40 | 35.2 |

TABLE 4

| Composition | Example 1 | Comp. Ex. 1 | Example 2 | Comp. Ex. 2 | Comp. Ex. 3 |
|---|---|---|---|---|---|
| Polymer B | 40 | | | | |
| Polymer C | | 40 | | | |
| Polymer K | | | 40 | | |
| Polymer L | | | | 40 | |
| Polymer d | | | | | 40 |
| Polymer a | 60 | 60 | 60 | 60 | 60 |
| Tensile strength (kg/cm²) | 248 | 203 | 253 | 208 | 214 |
| Abrasion resistance | 138 | 94 | 129 | 92 | 100 |
| Wet skid resistance | 115 | 103 | 114 | 112 | 100 |
| Rolling resistance (index, 60° C.) | 117 | 97 | 108 | 93 | 100 |

TABLE 5

| Composition | Comp. Ex. 4 | Ex. 3 | Ex. 4 | Ex. 5 | Ex. 6 | Ex. 7 | Comp. Ex. 5 | Comp. Ex. 6 |
|---|---|---|---|---|---|---|---|---|
| Polymer A | 40 | | | | | | | |
| Polymer D | | 40 | | | | | | |
| Polymer F | | | 40 | | | | | |
| Polymer I | | | | 40 | | | | |
| Polymer K | | | | | 40 | | | |
| Polymer N | | | | | | 40 | | |
| Polymer P | | | | | | | 40 | |
| Polymer d | | | | | | | | 40 |
| Polymer a | 60 | 60 | 60 | 60 | 60 | 60 | 60 | 60 |
| Tensile strength (kg/cm²) | 237 | 242 | 247 | 239 | 253 | 267 | 198 | 214 |
| Abrasion resistance | 142 | 137 | 131 | 124 | 129 | 121 | 78 | 100 |
| Wet skid resistance | 83 | 110 | 112 | 118 | 114 | 120 | 124 | 100 |
| Rolling resistance (index, 60° C.) | 120 | 114 | 111 | 110 | 108 | 105 | 83 | 100 |

TABLE 6

| Composition | Ex. 8 | Ex. 9 | Comp. Ex. 7 | Ex. 10 | Ex. 11 | Comp. Ex. 8 | Ex. 12 | Ex. 13 | Comp. Ex. 9 | Comp. Ex. 10 |
|---|---|---|---|---|---|---|---|---|---|---|
| Polymer E | 40 | | | | | | | | | |
| Polymer F | | 40 | | | | | | | | |
| Polymer G | | | 40 | | | | | | | |
| Polymer H | | | | 40 | | | | | | |
| Polymer I | | | | | 40 | | | | | |
| Polymer J | | | | | | 40 | | | | |
| Polymer M | | | | | | | 40 | | | |
| Polymer N | | | | | | | | 40 | | |
| Polymer O | | | | | | | | | 40 | |
| Polymer d | | | | | | | | | | 40 |
| Polymer a | 60 | 60 | 60 | 60 | 60 | 60 | 60 | 60 | 60 | 60 |
| Tensile strength (kg/cm²) | 247 | 239 | 205 | 251 | 250 | 199 | 270 | 267 | 196 | 250 |
| Abrasion resistance | 131 | 124 | 95 | 129 | 125 | 92 | 128 | 121 | 87 | 100 |
| Wet skid resistance | 112 | 118 | 91 | 117 | 113 | 94 | 124 | 120 | 94 | 100 |
| Rolling resistance (index, 60° C.) | 112 | 111 | 94 | 111 | 110 | 91 | 108 | 105 | 88 | 100 |

TABLE 7

| Composition | Ex. 14 | Comp. Ex. 11 | Ex. 15 | Comp. Ex. 12 | Ex. 16 | Comp. Ex. 13 | Comp. Ex. 14 |
|---|---|---|---|---|---|---|---|
| Polymer B | 40 | 40 | 40 | 40 | 40 | 40 | 40 |
| Polymer a | 60 | | | | | | |
| Polymer b | | 60 | | | | | |
| Polymer c | | | 60 | | | | |
| Polymer d | | | | 60 | | | |
| Polymer e | | | | | 60 | | |
| Nipol BR-1220 | | | | | | 60 | |
| NR RSS#3 | | | | | | | 60 |
| Tensile strength (kg/cm²) | 248 | 240 | 245 | 224 | 251 | 220 | 268 |
| Abrasion resistance | 101 | 100 | 102 | 102 | 100 | 157 | 96 |
| Wet skid resistance | 137 | 100 | 121 | 94 | 130 | 68 | 95 |
| Rolling resistance (index, 60° C.) | 103 | 100 | 104 | 100 | 103 | 99 | 90 |

TABLE 8

| Composition | Ex. 17 | Comp. Ex. 15 | Ex. 18 | Comp. Ex. 16 | Ex. 19 | Comp. Ex. 17 | Comp. Ex. 18 |
|---|---|---|---|---|---|---|---|
| Polymer E | 40 | 40 | 40 | 40 | 40 | 40 | 40 |

TABLE 8-continued

| Composition | Ex. 17 | Comp. Ex. 15 | Ex. 18 | Comp. Ex. 16 | Ex. 19 | Comp. Ex. 17 | Comp. Ex. 18 |
|---|---|---|---|---|---|---|---|
| Polymer a | 60 | | | | | | |
| Polymer b | | 60 | | | | | |
| Polymer c | | | 60 | | | | |
| Polymer d | | | | 60 | | | |
| Polymer e | | | | | 60 | | |
| Nipol BR-1220 | | | | | | 60 | |
| NR RSS#3 | | | | | | | 60 |
| Tensile strength (kg/cm$^2$) | 247 | 239 | 247 | 225 | 249 | 218 | 268 |
| Abrasion resistance | 102 | 100 | 101 | 100 | 101 | 159 | 99 |
| Wet skid resistance | 136 | 100 | 122 | 93 | 134 | 70 | 93 |
| Rolling resistance (index, 60° C.) | 102 | 100 | 103 | 100 | 103 | 100 | 89 |

TABLE 9

| Composition | Ex. 20 | Comp. Ex. 19 | Ex. 21 | Comp. Ex. 20 | Ex. 22 | Comp. Ex. 21 | Comp. Ex. 22 |
|---|---|---|---|---|---|---|---|
| Polymer H | 40 | 40 | 40 | 40 | 40 | 40 | 40 |
| Polymer a | 60 | | | | | | |
| Polymer b | | 60 | | | | | |
| Polymer c | | | 60 | | | | |
| Polymer d | | | | 60 | | | |
| Polymer e | | | | | 60 | | |
| Nipol BR-1220 | | | | | | 60 | |
| NR RSS#3 | | | | | | | 60 |
| Tensile strength (kg/cm$^2$) | 251 | 241 | 249 | 226 | 250 | 220 | 269 |
| Abrasion resistance | 102 | 100 | 103 | 101 | 101 | 154 | 99 |
| Wet skid resistance | 133 | 100 | 119 | 92 | 134 | 67 | 97 |
| Rolling resistance (index, 60° C.) | 102 | 100 | 102 | 100 | 101 | 100 | 90 |

TABLE 10

| Composition | Ex. 23 | Comp. Ex. 23 | Ex. 24 | Comp. Ex. 24 | Ex. 25 | Comp. Ex. 25 | Comp. Ex. 26 |
|---|---|---|---|---|---|---|---|
| Polymer M | 40 | 40 | 40 | 40 | 40 | 40 | 40 |
| Polymer a | 60 | | | | | | |
| Polymer b | | 60 | | | | | |
| Polymer c | | | 60 | | | | |
| Polymer d | | | | 60 | | | |
| Polymer e | | | | | 60 | | |
| Nipol BR-1220 | | | | | | 60 | |
| NR RSS#3 | | | | | | | 60 |
| Tensile strength (kg/cm$^2$) | 270 | 248 | 262 | 229 | 259 | 224 | 273 |
| Abrasion resistance | 103 | 100 | 102 | 101 | 102 | 146 | 94 |
| Wet skid resistance | 149 | 100 | 124 | 97 | 128 | 71 | 96 |
| Rolling resistance (index, 60° C.) | 103 | 100 | 102 | 100 | 101 | 100 | 86 |

TABLE 11

| Composition | Comp. Ex. 27 | Ex. 26 | Ex. 27 | Ex. 28 | Comp. Ex. 28 |
|---|---|---|---|---|---|
| Polymer D | 100 | 90 | 60 | 40 | |
| Polymer a | | 10 | 40 | 60 | 100 |
| Tensile strength (kg/cm$^2$) | 273 | 269 | 254 | 242 | 221 |
| Abrasion resistance | 149 | 136 | 125 | 120 | 100 |
| Wet skid resistance | 95 | 99 | 102 | 101 | 100 |
| Rolling resistance (index, 60° C.) | 121 | 118 | 112 | 110 | 100 |

TABLE 12

| Composition | Comp. Ex. 29 | Ex. 29 | Ex. 30 | Ex. 31 | Comp. Ex. 30 |
|---|---|---|---|---|---|
| Polymer K | 100 | 90 | 60 | 40 | |
| Polymer a | | 10 | 40 | 60 | 100 |
| Tensile strength (kg/cm$^2$) | 280 | 273 | 265 | 253 | 221 |
| Abrasion resistance | 143 | 138 | 129 | 119 | 100 |
| Wet skid resistance | 96 | 100 | 100 | 101 | 100 |
| Rolling resistance (index, 60° C.) | 123 | 119 | 115 | 109 | 100 |

EXAMPLES 32–39 & COMPARATIVE EXAMPLE 31

In each of the examples and comparative example, a polymerization reactor constructed of a stainless steel autoclave having an internal capacity of 15 l was washed, dried and then purged with dry nitrogen. The reactor was charged with 1,3-butadiene and styrene in the corresponding amounts shown in Table 13, and then with 7,000 g of cyclohexane.

The dibutyl magnesium/triethyl aluminum complex (Mg/Al molar ratio: 5.0) and t-butoxy barium were then added in the corresponding amounts given in Table 13. It is however to be noted that the amount of the dibutyl magnesium/triethyl aluminum complex is indicated in terms of magnesium. Immediately after the addition, 1,3-butadiene was continuously added over 3 hours in the corresponding amount specified in Table 13. The contents of the polymerization reactor were subjected to polymerization under stirring at 80° C. for 5 hours.

After completion of the polymerization reaction, the corresponding reactant specified in Table 13 was added in an amount of 0.05 mole, followed by an addition reaction for 30 minutes so that end modification was conducted. Methanol was thereafter added to the polymerization reactor, whereby the reaction was terminated. After 8 g of BHT were added, the solvent was removed by steam stripping. Drying of the resultant polymer was carried out at 60° C. for 24 hours.

The styrene content of the styrene-butadiene copolymer obtained in the above-described manner and the trans-1,4 bond content of its butadiene moieties were measured similarly to Example 1. The measurement results are shown together with its block polystyrene content and Mooney viscosity ($ML_{1+4}$, 100° C.) in Table 13.

Using the corresponding blend rubber component indicated in Table 14, a rubber composition was prepared in accordance with the formulation shown in Table 3. In a similar manner to Example 1, the rubber composition was vulcanized under pressure, whereby test pieces were formed, and the physical properties of the thus-vulcanized material were measured. The results are summarized in Table 14.

As is apparent from Table 14, the rubber compositions of the present invention retain tensile strength at a high level and are improved in abrasion resistance and also in the balancing between wet skid resistance and rolling resistance. In particular, the improvements in abrasion resistance are substantial. The above-mentioned balancing can be improved further by modifying the manner of polymerization such that styrene units are distributed at random along the molecular chain of the resulting polymer.

We claim:

1. A rubber composition comprising as rubber components:
(A) 30–95 wt. % of an end-modified styrene-butadiene copolymer obtained by reacting at least one compound to active terminals of a starting styrene-butadiene copolymer containing butadiene moieties, the trans-1,4 bond content of which is 70–95 wt. %, and having a styrene content of 5–60 wt. %, said at least one compound being selected from N-substituted aminoketones, N-substituted thioaminoketones, N-substituted aminoaldehydes, N-substituted thioaminoaldehydes and compounds containing in the molecules thereof an atomic group represented by the following formula:

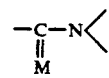

in which M stands for an oxygen or sulfur atom; and
(B) 70–5 wt. % of a diene rubber other than the end-modified styrene-butadiene copolymer (A), said diene rubber having a glass transition temperature higher than −60° C.

2. The composition of claim 1, wherein the starting styrene-butadiene copolymer contains butadiene moieties, whose trans-1,4 bond content is 75–95 wt. %, and has a styrene content of 5–45 wt. %, a weight average molecular weight of 150,000–500,000, and a Mooney viscosity ($ML_{1+4}$, 100° C.) of 10–150.

3. The composition of claim 1, wherein the starting styrene-butadiene copolymer has a block polystyrene content not greater than 10 wt. % based on the starting styrene-butadiene copolymer.

4. The composition of claim 1, wherein the end-modified styrene-butadiene copolymer (A) has been obtained by using said at least one compound in a proportion of

TABLE 13

| | Amount charged upon polymerization | | | | | | Characteristics of produced polymer | | | |
|---|---|---|---|---|---|---|---|---|---|---|
| Polymer | Styrene (g) | Butadiene (g) | Mg/Al (mol) | Ba (mmol) | Butadiene (g) | Reactant | Styrene (%) | Trans (%) | $ML_{1+4}$ | Block P-ST(%) |
| Q | 140 | 660 | 0.027 | 4.6 | 200 | N-Vinyl-2-pyrrolidone | 14.0 | 84.9 | 38.1 | 0.4 |
| R | 200 | 500 | 0.032 | 4.8 | 300 | N-Methyl-2-ε-caprolactam | 20.2 | 85.3 | 37.6 | 0.6 |
| S | 280 | 360 | 0.036 | 5.4 | 360 | Dimethy-imidazolidinone | 27.9 | 84.7 | 40.3 | 1.2 |
| T | 410 | 300 | 0.035 | 5.2 | 290 | N-Methyl-2-ε-caprolactam | 39.8 | 82.2 | 43.1 | 1.9 |

TABLE 14

| Composition | Ex. 32 | Ex. 33 | Ex. 34 | Ex. 35 | Ex. 36 | Ex. 37 | Ex. 38 | Ex. 39 | Comp. Ex. 31 |
|---|---|---|---|---|---|---|---|---|---|
| Polymer E* | 40 | | | | | | | | |
| Polymer Q | | 40 | | | | | | | |
| Polymer H* | | | 40 | | | | | | |
| Polymer R | | | | 40 | | | | | |
| Polymer K* | | | | | 40 | | | | |
| Polymer S | | | | | | 40 | | | |
| Polymer M* | | | | | | | 40 | | |
| Polymer T | | | | | | | | 40 | |
| Polymer d | | | | | | | | | 40 |
| Polymer a | 60 | 60 | 60 | 60 | 60 | 60 | 60 | 60 | 60 |
| Tensile strength (kg/cm²) | 247 | 253 | 251 | 257 | 253 | 258 | 270 | 276 | 214 |
| Abrasion resistance | 131 | 134 | 129 | 132 | 129 | 131 | 128 | 128 | 100 |
| Wet skid resistance | 112 | 125 | 117 | 124 | 114 | 118 | 124 | 126 | 100 |
| Rolling resistance (index, 60° C.) | 112 | 117 | 111 | 113 | 108 | 111 | 108 | 110 | 100 |

*Content of block polystyrene E: 2.1%, H: 3.2%, K: 4.8%, M: 5.9%

0.05-10 moles per mole of a catalyst employed upon production of the starting styrene-butadiene copolymer.

5. The composition of claim 1, wherein the compounds containing in the molecules thereof an atomic group represented by the formula,

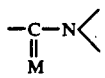

are N-substituted lactams, N-substituted thiolactams, N-substituted ethyleneureas and N-substituted thioethyleneureas.

6. The composition of claim 1, wherein the diene rubber (B) having the glass transition temperature higher than $-60°$ C. is at least one polymer selected from styrene-butadiene copolymers, butadiene polymers and isoprene polymers.

7. The composition of claim 1, comprising as rubber compositions 30-90 wt. % of the end-modified styrene-butadiene copolymer (A) and 70-10 wt. % of the diene rubber (B).

* * * * *